(12) United States Patent
Vaughan et al.

(10) Patent No.: US 12,199,739 B2
(45) Date of Patent: *Jan. 14, 2025

(54) SATELLITE CONSTELLATION HAVING MULTIPLE ORBITAL INCLINATIONS

(71) Applicant: Blue Digs LLC, Wilmington, DE (US)

(72) Inventors: Robert Vaughan, Redondo Beach, CA (US); Greg Busche, Rolling Hills, CA (US); Brett Poirier, Long Beach, CA (US); Robert Hawkins, Hermosa Beach, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/461,854

(22) Filed: Sep. 6, 2023

(65) Prior Publication Data

US 2023/0421247 A1 Dec. 28, 2023

Related U.S. Application Data

(63) Continuation of application No. 17/372,270, filed on Jul. 9, 2021, now Pat. No. 11,799,542, which is a
(Continued)

(51) Int. Cl.
*H04B 7/185* (2006.01)
*B64G 1/10* (2006.01)
(Continued)

(52) U.S. Cl.
CPC ......... *H04B 7/18521* (2013.01); *B64G 1/242* (2013.01); *H04B 7/185* (2013.01);
(Continued)

(58) Field of Classification Search
None
See application file for complete search history.

(56) References Cited

U.S. PATENT DOCUMENTS 5,553,816 A * 9/1996 Perrotta ............... B64G 1/1085
455/12.1
5,887,257 A 3/1999 Olds
(Continued)

FOREIGN PATENT DOCUMENTS

CN 1268814 A 10/2000
CN 103957045 A 7/2014
(Continued)

OTHER PUBLICATIONS

Wertz, Circular vs. Elliptical Orbits for Persistent Communications, 5th Responsive Space Conference, Apr. 23-26, 2007 (Year: 2007).*
(Continued)

*Primary Examiner* — Mohammed Rachedine

(57) ABSTRACT

A satellite system may have a constellation of communications satellites that provides services to users with electronic devices such as portable electronic devices and home and office equipment. A network operations center may use gateways to communicate with the satellite constellation. The satellite constellation may include sets of satellites with different orbits such as circular orbits with different inclinations, sets of satellites with elliptic orbits, sets of satellites with circular orbits of different altitudes including low earth orbits, medium earth orbits, and/or geosynchronous orbits, and/or sets of satellites with other orbits. The satellite orbits of the satellites in the satellite constellation may be selected to provide coverage to desired user population concentrations at different locations on the earth without using an excessive number of satellites.

20 Claims, 6 Drawing Sheets

Related U.S. Application Data continuation of application No. 16/900,721, filed on Jun. 12, 2020, now Pat. No. 11,063,660, which is a continuation of application No. 16/517,265, filed on Jul. 19, 2019, now Pat. No. 10,707,953, which is a continuation of application No. 15/672,136, filed on Aug. 8, 2017, now Pat. No. 10,361,773.

(60) Provisional application No. 62/489,378, filed on Apr. 24, 2017.

(51) Int. Cl.
   *B64G 1/24* (2006.01)
   *H04B 7/19* (2006.01)

(52) U.S. Cl.
   CPC ........... *H04B 7/18584* (2013.01); *H04B 7/19* (2013.01); *B64G 1/1007* (2013.01); *B64G 1/1085* (2013.01)

(56) References Cited

U.S. PATENT DOCUMENTS

| | | | |
|---|---|---|---|
| 5,896,558 A | 4/1999 | Wiedeman | |
| 5,906,337 A * | 5/1999 | Williams | B64G 1/1085 455/13.1 |
| 5,971,324 A | 10/1999 | Williams et al. | |
| 6,327,523 B2 | 12/2001 | Cellier | |
| 6,519,773 B1 | 2/2003 | Ahmed et al. | |
| 6,625,129 B1 * | 9/2003 | Olds | H04B 7/2041 370/320 |
| 7,120,139 B1 | 10/2006 | Kung et al. | |
| 2002/0177403 A1 * | 11/2002 | LaPrade | H04B 7/195 455/12.1 |
| 2009/0051589 A1 * | 2/2009 | Schiff | H04B 7/18519 342/352 |
| 2009/0161797 A1 | 6/2009 | Cowles et al. | |
| 2012/0018585 A1 | 1/2012 | Liu et al. | |
| 2015/0158602 A1 | 6/2015 | Marshack et al. | |
| 2015/0197350 A1 * | 7/2015 | Ho | B64G 1/242 244/158.4 |
| 2016/0037434 A1 | 2/2016 | Gopal et al. | |
| 2017/0366251 A1 | 12/2017 | Ravishankar et al. | |

FOREIGN PATENT DOCUMENTS

| | | | | |
|---|---|---|---|---|
| CN | 106209205 A | | 12/2016 | |
| CN | 106464343 A | | 2/2017 | |
| CN | 106788671 A | * | 5/2017 | |
| EP | 0955737 B1 | | 10/2001 | |
| EP | 2206256 A1 | * | 7/2010 | ............. H04B 7/185 |
| WO | 2007143478 A3 | | 12/2007 | |

OTHER PUBLICATIONS

Fatehi et al., "A Study of the Relative Speed and Doppler Effects in Space-Based Networks", 2008 IEEE Aerospace Conference, Mar. 1-8, 2008, 11 pages.

Yuefeng, Modern Communication Technology 4th Edition, Jan. 31, 2014.

* cited by examiner

SATELLITE CONSTELLATION HAVING MULTIPLE ORBITAL INCLINATIONS

This application is a continuation of U.S. patent application Ser. No. 17/372,270, filed Jul. 9, 2021, which is a continuation of U.S. patent application Ser. No. 16/900,721, filed Jun. 12, 2020, which is a continuation of U.S. patent application Ser. No. 16/517,265, filed Jul. 19, 2019, which is a continuation of U.S. patent application Ser. No. 15/672,136, filed Aug. 8, 2017, which claims the benefit of provisional patent application No. 62/489,378, filed on Apr. 24, 2017, each of which is hereby incorporated by reference herein in its entirety.

FIELD

This disclosure relates generally to satellite communications, including to constellations for satellite communications that include satellites having different inclinations, e.g., to provide different coverage.

BACKGROUND

Communications systems often use satellites to convey data. Satellite-based systems allow information to be conveyed wirelessly over large distances, such as oceans. For example, satellite-based systems can be used to convey information to land-based devices such as handheld equipment and home or office equipment. Further, satellite communications systems can be used to provide coverage where physical infrastructure has not been installed and/or to mobile devices that do not remain attached to an infrastructure resource.

It can be challenging to implement an effective satellite-based communications system. If care is not taken, satellites may be deployed inefficiently, leading to elevated costs and suboptimal ground coverage. Further, if a satellite-based communications system is designed to serve a period or region of highest demand, resources may remain idle during periods of lower demand and/or over regions with lower demand. Moreover, a conventional satellite-based communication system designed for a particular demand level may not be able to dynamically increase capacity in response to higher demand.

SUMMARY

A satellite system may have a satellite constellation of communications satellites that provides services (e.g., voice and/or data services) to electronic devices, such as portable electronic devices and home/office equipment. A network operations center may use gateways to communicate with the satellite constellation.

The satellite constellation may include sets of one or more satellites, with each set having different orbits. The satellite constellation may, as an example, include any/all of a set of satellites with circular orbits having different inclinations, a set of satellites with elliptic orbits, a set of satellites with circular orbits of different altitudes including low earth orbits (LEO) (of one or more different altitudes), medium earth orbits (MEO), and/or geosynchronous orbits (e.g., highly inclined geosynchronous orbits), sun synchronous orbits and/or other sets of satellites.

The orbits of the satellites in the satellite constellation may be selected to enhance service efficiency. For example, one or more orbits may be selected to concentrate coverage over user population centers at various locations on the Earth. Additionally or alternatively, one or more orbits may be selected to accommodate peaks in demand that coincide with particular times of day. Such a design may help reduce the number of satellites needed to provide a desired amount of coverage.

DETAILED DESCRIPTION

The present disclosure, including the accompanying drawings, is illustrated by way of examples and not by way of limitation.

Figure 1:
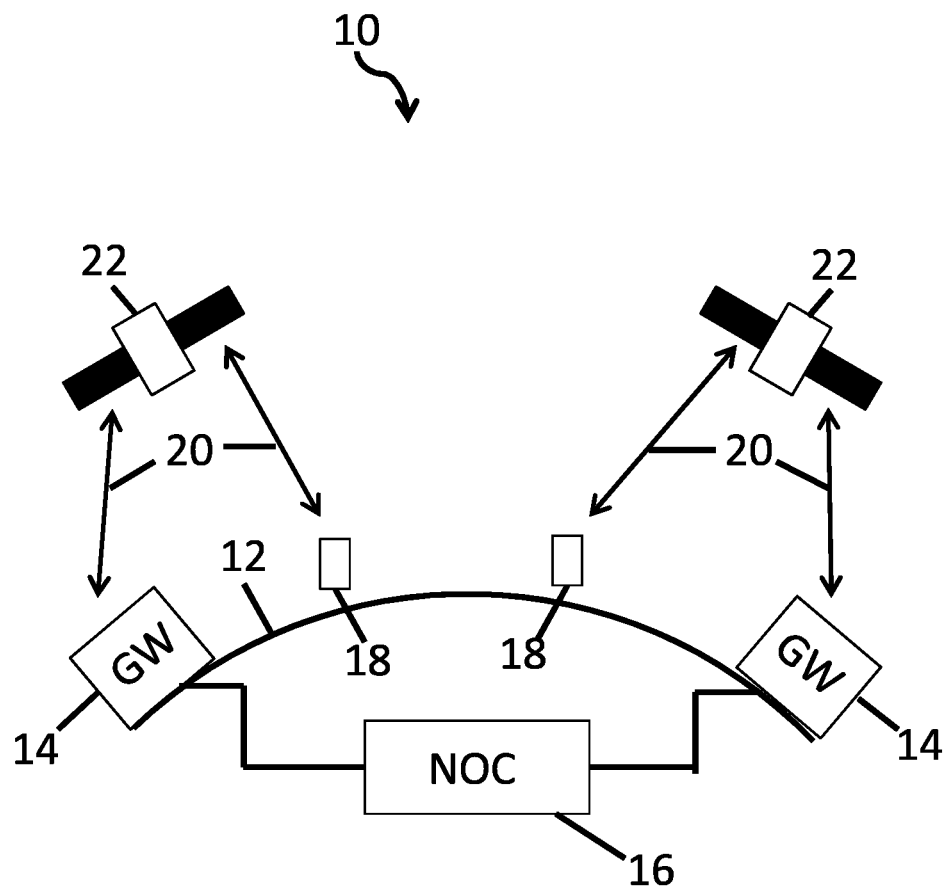
FIG. 1 presents a diagram of an example communications system including satellites, in accordance with some embodiments.

A communications network may include one or more communications satellites and other equipment, including ground-based communications equipment and user terminals (or user equipment (UE)). One or more of the satellites may be used to deliver wireless services, e.g., to portable electronic devices, home and/or office equipment, and other equipment. For example, wireless services can be provided to handheld devices, wearable devices, set-top boxes, media devices, mobile terminals, computing devices, sensors, etc. An illustrative communications system with satellites is shown in FIG. 1. As shown in FIG. 1, system 10 may include one or more constellations of communications satellites 22. Satellites 22 may be placed in any/all of low earth orbit (LEO) (e.g., at altitudes of 500-1500 km or other suitable altitudes), geosynchronous orbit, and/or medium earth orbit (MEO) around the Earth 12. Satellites 22 may form a satellite constellation having one or more sets of satellites with different types of orbits, e.g., that are synchronized with each other to provide user populations (or geographic regions) with desired amounts of coverage. There may be any suitable number of satellites 22 in the satellite constellation(s) of system 10 (e.g., 10-100, 1,000-10,000, more than 100, more than 1000, fewer than 10,000, etc.).

Satellites 22 may deliver wireless services to equipment such as electronic devices 18. Electronic devices 18 may include handheld devices and/or other mobile devices, such as cellular telephones, tablet computers, laptop computers, wristwatches and other wearable devices, mobile terminals, drones, robots, and other portable electronic devices. Electronic devices 18 may also include stationary (or less portable) equipment, such as set-top boxes (e.g., satellite receivers), routers, home base stations, televisions, desktop computers, ground terminals (e.g., gateways), and other electronic equipment. Electronic devices 18 may be located anywhere on or above the Earth, e.g., on land, at sea, or in the air. The services provided by satellites 22 may include telephone (voice) service, broadband internet access, media distribution services such as satellite audio (satellite radio and/or streaming audio services) and satellite television (video), data communications, location, and/or other services.

System 10 may include one or more network operations centers (NOCs) such as NOC 16, which can be coupled to one or more gateways, e.g., gateways 14 (sometimes referred to as ground stations). There may be any suitable number of gateways 14 in system 10 (e.g., 1-100, more than 10, more than 100, fewer than 1000, etc.). Gateways 14 may have transceivers that allow the gateways to transmit wireless signals to satellites 22 over wireless links 20 and that allow the gateways to receive wireless signals from satellites 22 over wireless links 20. Wireless links 20 may also be used to support communications between satellites 22 and electronic devices 18. During media distribution operations, for example, a gateway 14 may send traffic over an uplink (one of links 20) to a given satellite 22 that is then routed via a downlink (one of links 20) to one or more electronic devices 18. Gateways 14 may perform a variety of services, including supplying media for electronic devices 18, routing telephone calls (e.g., voice and/or video calls) between electronic devices 18 and/or other equipment, providing electronic devices 18 with internet access, and/or delivering other communications and/or data services to electronic devices 18. Gateways 14 may communicate with each other via satellites 22 and/or using ground-based communications networks.

NOC 16 may be used to manage the operations of one or more gateways 14 and/or the operations of one or more satellites 22. For example, NOC 16 may monitor network performance and take appropriate corrective actions if warranted. During these operations, NOC 16 may update software for one or more satellites 22 and/or electronic devices 18, may adjust satellite 22 altitude and/or other orbital parameters, may direct one or more satellites 22 to perform operations to adjust satellite solar panels and/or other satellite components, and/or may otherwise control and maintain one or more of the satellites 22 in the constellation of satellites orbiting the Earth 12. Further, in some embodiments, NOC 16 also may be configured to perform maintenance operations on one or more gateways 14.

Gateways 14, satellites 22, NOC 16, and electronic devices 18 may be configured to support encrypted communications. For example, NOC 16 and gateways 14 may communicate using encrypted communications. Similarly, gateways 14, satellites 22, and electronic devices 18 may communicate using encrypted communications. This allows NOC 16 to issue secure commands and to receive secure information when communicating with gateways 14, satellites 22, and/or electronic devices 18. The use of encrypted communications within system 10 also allows electronic devices 18 to securely communicate with each other and with gateways 14, and also allows gateways 14 to securely distribute media and/or other information to electronic devices 18, e.g., in compliance with digital protection requirements.

During operation of system 10, satellites 22 may serve as orbiting relay stations. For example, when a gateway 14 transmits a wireless uplink signal, one or more satellites 22 may forward these signals as downlink signals to one or more electronic devices 18. In some embodiments, some electronic devices 18 may be receive-only devices while other electronic devices 18 may support bidirectional communications with satellites. In scenarios in which an electronic device 18 supports bidirectional communications, an electronic device 18 may transmit wireless signals to one or more satellites 22, so that the one or more satellites 22 may relay this information to one or more appropriate destinations (e.g., gateways 14, other electronic devices 18, etc.).

Satellites 22 and links 20 may support any suitable satellite communications bands (e.g., IEEE bands), such as the L-band (1-2 GHz), S-band (2-4 GHz), C-band (4-8 GHz), Ka-band (27-40 GHz), V-band (40-75 GHz), W-band (75-110 GHz), and/or other bands suitable for space communications (e.g., frequencies above 1 GHz, below 110 GHz, and/or other suitable frequencies).

Some frequencies (e.g., C-band frequencies and other low frequencies such as L-band and S-band frequencies) may penetrate buildings and may therefore be suitable for communicating with electronic devices located indoors at least some of the time, e.g., handheld electronic devices 18 (e.g., devices that are mobile and that may sometimes be indoors and may sometimes be outdoors) and/or electronic devices 18 without an external antenna/receiver. Other frequencies (e.g., V-band frequencies and other high frequencies such as Ka-band and W-band frequencies) do not readily (or effectively) penetrate buildings and may therefore be suitable for communicating with electronic devices 18 that have an external antenna/receiver or that are located outdoors and/or otherwise have a line-of-sight path to satellites 22. To accommodate a variety of scenarios, e.g., both mobile device scenarios and home/office scenarios, satellites 22 may, for example, include C-band satellites (or other low band satellites such as L-band or S-band satellites), V-band satellites (or other high band satellites such as Ka-band or W-band satellites) and/or dual-band satellites (e.g., satellites that that support C-band and V-band communications or other low and high band communications).

In general, population density is not uniform and varies across latitudes. However, satellite resources traditionally have been distributed across latitudes without distinguishing between less populated regions and more densely populated regions. As a result, a constellation organized in such manner requires more satellites (vehicles) to provide coverage over populated areas—thereby providing a surplus of coverage over less densely populated areas. However, efficiencies can be achieved by dividing a constellation of satellites into groups of multiple sub-constellations, each with an inclination and quantity of satellites sized to provide the bulk of its coverage to areas in which the population (e.g., actual population and/or user population) is dense. As a result, use of the constellation's resources can be enhanced as the number of satellites required to provide coverage and capacity is reduced, while excess capacity does not go unused over less populated areas. To ensure an efficient placement of on-orbit satellites, the constellation design can be implemented to match coverage-density with population-density (either actual or user), as closely as possible. For example, a geographic increase (e.g., peak) in population-density (or other such metric) identifies a service area by latitude. In at least some implementations, there can be multiple such service areas. Accordingly, a constellation can employ multiple sets of satellites with different orbital inclinations, e.g., Walker orbit inclinations, to approximate a match of coverage-density to population-density, facilitating an efficient placement of on-orbit satellites.

Figure 2:
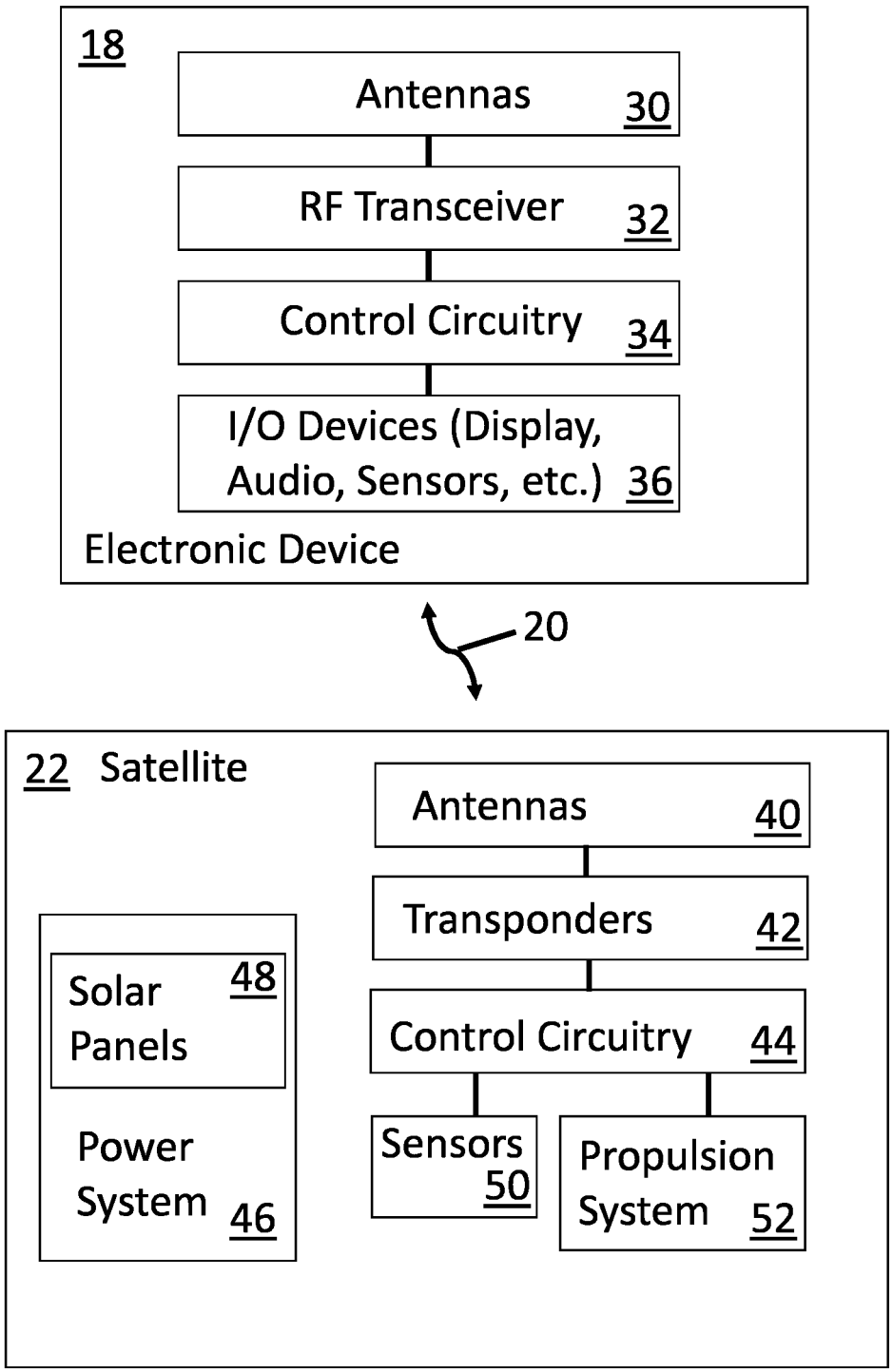
FIG. 2 presents a schematic diagram showing an example of an electronic device in communication with a communications satellite, in accordance with some embodiments.

FIG. 2 presents a schematic diagram of an illustrative electronic device 18 in communication, over a wireless communications link 20, with an illustrative satellite 22. As shown in FIG. 2, electronic device 18 may include one or more antennas 30. Antennas 30 may include monopoles, dipoles, and/or other types of antenna elements. Antennas 30 may, for example, include loop antennas, helical antennas, patch antennas, inverted-F antennas, Yagi antennas, slot antennas, horn antennas, cavity antennas, dish antennas, arrays of antennas (e.g., a phased antenna array that supports beam steering operations), or other suitable antennas. The antennas 30 can be implemented such that they are suitable for communication with one or more satellites using one or more satellite communications bands. Radio-frequency transceiver circuitry 32 may include radio-frequency receiver circuitry and/or radio-frequency transmitter circuitry that allows electronic device 18 to transmit and/or receive wireless signals over wireless communications link 20 using one or more antennas 30. Electronic device 18 may also include control circuitry 34 and input-output devices 36. Control circuitry 34 may include storage, such as solid-state drives, random-access memory, and/or hard disk drives and other volatile and/or nonvolatile memory. Control circuitry 34 may also include one or more microcontrollers, microprocessors, digital signal processors, communications circuits with processors, application specific integrated circuits, programmable logic devices, field programmable gate arrays, and/or other processing circuitry. During operation, control circuitry 34 may run code (instructions) that is stored in the storage of control circuitry 34 to implement desired functions for electronic device 18.

Control circuitry 34 may use input-output devices 36 to supply output to an interface configured to render output perceivable by a user and/or to external equipment, and may gather input received from a user and/or external source(s). Input-output devices 36 may include displays configured to present images, audio devices (e.g., speakers and/or microphones), sensors, controls, and other components. For example, input-output devices 36 may include user input devices such as one or more buttons, touch screens, sensors (e.g., accelerometers and/or gyroscopes), microphones for gathering voice commands, and/or other components for gathering input from a user. Further, input-output devices 36 may include speakers, light-emitting components, displays, vibrators and/or other haptic output devices, and other equipment for supplying a user with output. Input-output devices 36 may include sensors such as force sensors, position sensors, gyroscopes, magnetic sensors, accelerometers, capacitive touch sensors, proximity sensors, ambient light sensors, temperature sensors, moisture sensors, gas sensors, pressure sensors, and other sensors for gathering information representative of the environment in which electronic device 18 is located.

A satellite, such as satellite 22, may include one or more antennas 40. Antennas 40 may be based on any suitable type(s) of antenna elements (e.g., antenna elements such as monopoles or dipoles, loop antennas, helical antennas, patch antennas, inverted-F antennas, Yagi antennas, slot antennas, horn antennas, cavity antennas, etc.). Antennas 40 may be used in any suitable type(s) of antenna arrays (e.g., phased antenna arrays, fixed direct radiating arrays, deployable direct radiating antenna arrays, space fed arrays, reflector fed arrays, etc.). The antennas 40 can be implemented such that they are suitable for communication with one or more electronic devices 18, gateways 14, or other communication devices/nodes using one or more satellite communications bands.

Satellite 22 may include transceiver circuitry that is communicatively coupled (directly or indirectly) to antennas 40. The transceiver circuitry may include one or more components, such as one or more transponders 42 for receiving uplink signals and transmitting downlink signals, e.g., over links 20. Further, control circuitry 44 may be used to control the operation of satellite 22. Control circuitry 44 may include storage and/or processing circuits of the type used in control circuitry 34.

Power may be supplied to satellite 22 from power system 46. Power system 46 may include one or more solar panels 48 (or arrays of solar panels) for converting energy from the sun into electrical power. Power system 46 may include power regulator circuitry and batteries for storing electrical power generated by solar panels 48, and for distributing power to the components of satellite 22. Control circuitry 44 may receive information from one or more sensors 50. Further, control circuitry 44 may receive commands from NOC 16 and, using information from one or more sensors and/or received commands, may perform maintenance and/or control operations (e.g., software updates, operations related to the deployment and operation of solar panels 48, diagnostic routines, altitude adjustments and other orbital adjustments using propulsion system 52, etc.). Sensors 50 may include light-based sensors (e.g., infrared cameras, visible light cameras, etc.), lidar, radar, sensors that measure backscattered light and/or backscattered radio-frequency signals, temperature sensors, radiation sensors, accelerometers, gyroscopes, magnetic sensors, spectrometers, and/or other sensors. Sensors 50 may be used in performing remote sensing operations, fault detection, satellite positioning, and other operations.

It may be desirable for the constellation of satellites 22 in system 10 to include satellites with different types of orbits. As an example, satellites 22 may include orbits with different altitudes, eccentricities, inclinations, and other orbital attributes. One or more sun synchronous satellites (or a satellite in a sun synchronous orbit) may be included in the constellation of satellites 22 in system 10. The one or more sun synchronous satellites can be configured to help meet demand (e.g., as measured in throughput, the number of simultaneous connections, or other such measures) during a high-demand period, such as during an afternoon or evening period. By combining different orbital types within the same satellite constellation, satellite resources can be deployed with enhanced efficiency.

Figure 3:
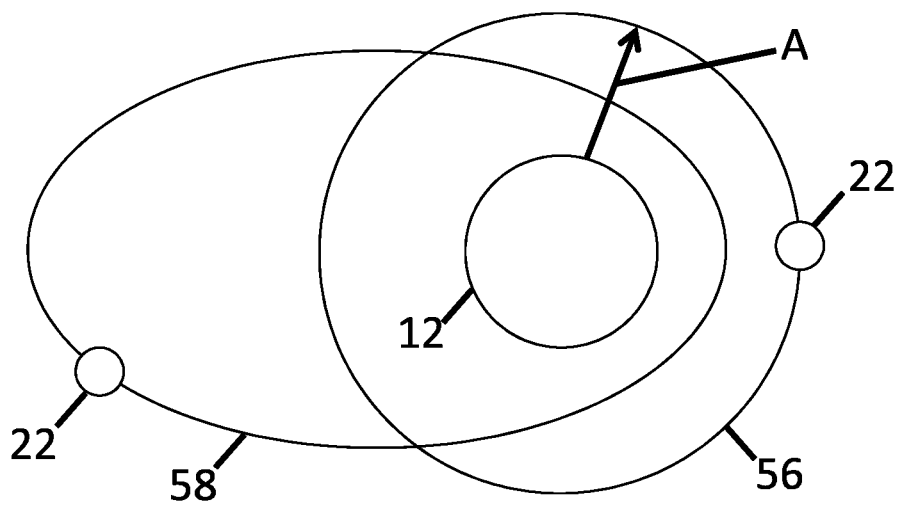
FIG. 3 presents a diagram of illustrative satellite orbits around the Earth, in accordance with some embodiments.

FIG. 3 is a diagram of two illustrative satellite orbits (geocentric orbits) about the Earth 12. A satellites 22 may orbit in a circular orbit as shown by illustrative circular orbit 56 or in an elliptic orbit such as elliptic orbit 58. A circular orbit is characterized by an eccentricity of 0. An elliptical orbit has an eccentricity of greater than 0.

A satellite in a circular orbit may be characterized by an orbital altitude A, as shown in FIG. 3. Satellites 22 may orbit at any altitude suitable for their intended purpose. For example, a satellite 22 may orbit Earth 12 in low earth orbit (e.g., at an altitude A of 500-1500 km), in geosynchronous orbit (at an altitude A of approximately 35,800 km), or in medium earth orbit (e.g., between low earth orbit and geosynchronous orbit). Examples of medium earth orbits include semi-synchronous orbits and Molniya orbits. Semi-synchronous orbits have an altitude of about 20,000 km and are characterized by an orbital period of one half of one sidereal day. A Molniya orbit has an eccentricity of greater than zero and a perigree location in the Southern Hemisphere so a satellite in this type of orbit will spend most of its orbital time above the Northern Hemisphere or vice versa. A Tundra orbit is an elliptical orbit (with an eccentricity greater than zero) that has twice the orbital period of a Molniya orbit. Other elliptical orbits may be used, if desired (e.g., orbits with eccentricities of at least 0.3, at least 0.5, at least 0.7, less than 0.8, etc.).

Figure 4:
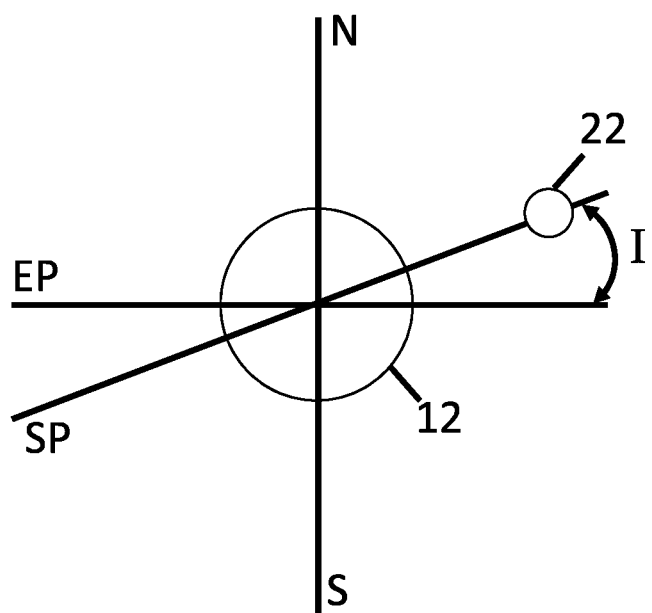
FIG. 4 presents a diagram of the Earth and an associated inclined satellite orbit, in accordance with some embodiments.

If desired, a satellite may have an inclined circular orbit (a circular orbit out of the equatorial plane). Consider, as an example, satellite 22 of FIG. 4. In the diagram of FIG. 4, satellite 22 is orbiting about Earth 12 in satellite orbital plane SP. Plane SP is inclined at inclination (inclination angle) I with respect to equatorial plane EP, which is a plane that is aligned with the Earth's equator. Polar orbits (sometimes referred to as nearly polar orbits) are orbits that pass over the north and south poles and are therefore characterized by inclinations of about 90° (e.g., at least 85°, at least 88°, at least 89°, 90°, less than 90°, or other suitable polar orbit inclination).

One or more of satellites 22 in the satellite constellation of system 10 may have a sun synchronous orbit. Sun synchronous orbits (heliosynchronous orbits) are polar orbits (near polar orbits) that pass the equator (or other given latitude) at the same local time each day. The altitude and inclination of a sun synchronous orbit are such that the nodal regression rate matches the Earth orbit rate. As a result, to a user on the ground, a sun synchronous satellite will pass overhead at the same time of day each day. Because satellites with sun synchronous orbits are available to handle communications traffic at the same local time each day, the inclusion of one or more sun synchronous satellites in the satellite constellation of system 10 may help the satellite constellation to efficiently meet peak traffic demands.

In general, each type of orbit that is included in the satellite constellation of system 10 may help augment the performance of the constellation in a different way. For example, an elliptic orbit such as Molniya or Tundra orbit may be used to provide capacity to a user population center at a particular longitude and/or latitude (or range(s) thereof) in the Northern or Southern Hemisphere (e.g., a population center in Europe, North America, Australia, or Asia). Further, sun synchronous orbits may be used to provide capacity that is concentrated on one or more high-demand times of day (e.g., mornings or evenings). Inclined circular orbits may be used to provide coverage over a desired range of latitudes. Low-earth orbits may help reduce latency (e.g., for traffic that involves voice telephone calls and other latency-sensitive traffic) and may help reduce transmit and receive powers. Medium-earth orbits and geosynchronous orbits may help increase coverage, reducing the total number of satellites needed to service a given region and may be well suited to broadcast-type traffic (e.g., media distribution services such as television services, music services, etc.).

Figure 5:
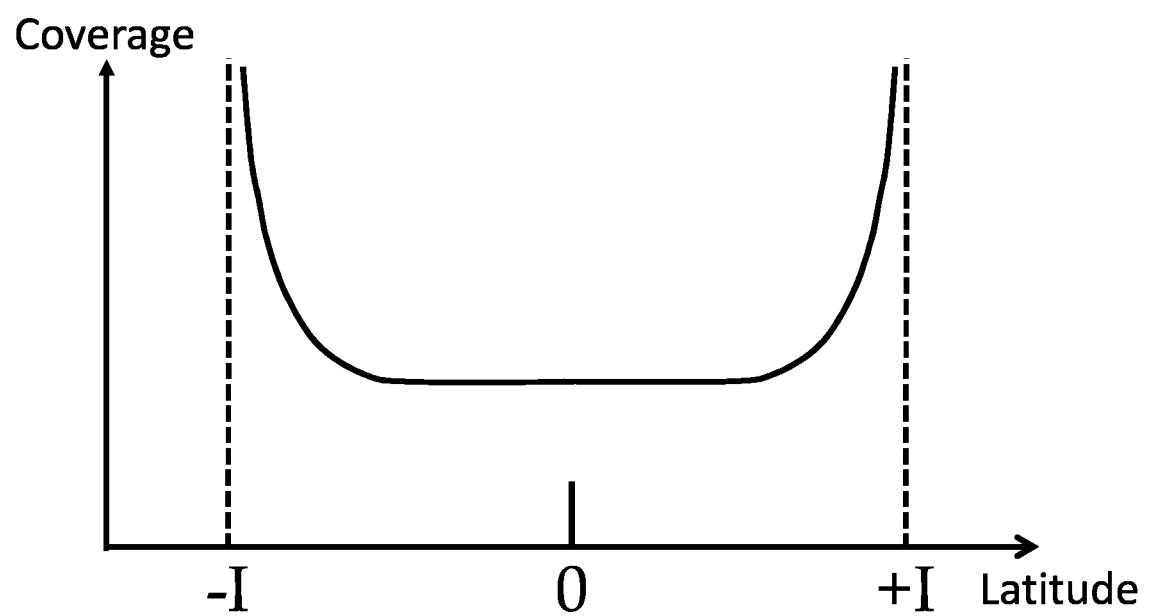
FIG. 5 presents a graph in which coverage (e.g., probability density) for an illustrative satellite with an inclined orbit is plotted as a function of latitude, in accordance with some embodiments.

Consider, as an example, a satellite with an inclined circular orbit. An example of the coverage (probability density) of a satellite with an inclination I as a function of latitude is illustrated in FIG. 5. As illustrated in FIG. 5, coverage for an inclined orbit is concentrated near +I and −I. This attribute of an inclined orbit allows the corresponding coverage to be selectively concentrated over one or more latitudes, e.g., latitudes associated with increased demand, such as user population centers (user traffic concentrations). By using sets of satellites, each of which is associated with a particular inclination, multiple areas of relatively higher demand (e.g., user population centers) at multiple respective different latitudes may be served. If, as an example, user populations are concentrated at latitudes of 55°, 48°, 40°, and 33°, the satellite constellation of system 10 may include a first group of N1 satellites 22 with orbits having an inclination of 55°, a second group of N2 satellites 22 with orbits having an inclination of 48°, a third group of N3 satellites 22 with orbits having an inclination of 40°, and a fourth group of N4 satellites 22 with orbits having an inclination of 33°.

Figure 6:
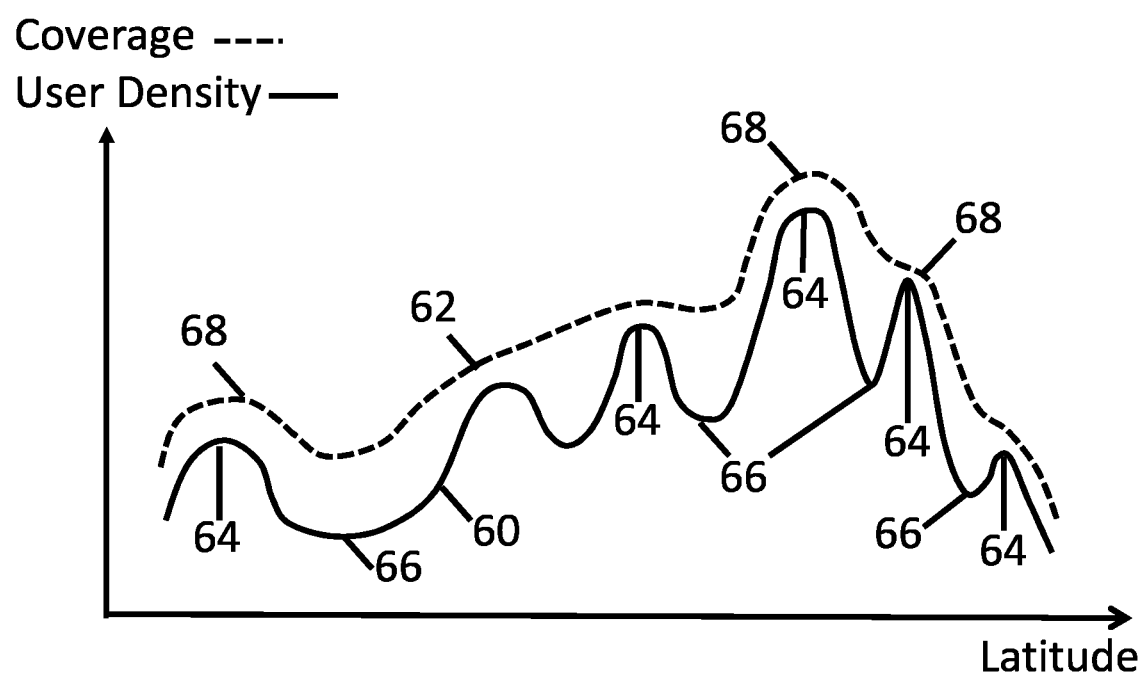
FIG. 6 presents a diagram showing how user population density may vary as a function of latitude and may exhibit increased density (e.g., peaks) and decreased density (e.g., valleys), and that shows how a satellite constellation may include satellite orbits with multiple different inclinations and other orbital attributes selected to match satellite coverage to user population density, in accordance with some embodiments.

As illustrated by solid line 60 in the graph off FIG. 6, an exemplary user population density may be characterized by one or more peaks 64 and one or more valleys 66 at different latitudes. By adjusting the numbers of satellites at each corresponding inclination (e.g., the values of N1, N2, N3, and N4 in the preceding example), a satellite coverage (probability density) curve, such as dashed line curve 62 of FIG. 6 may be produced that has one or more peaks 68 that partly or fully overlap peaks 64 and thereby help accommodate the variations in user population density 60. By varying the numbers of satellites 22 with orbits at each of multiple different inclinations, the total number of satellites 22 may be reduced in the satellite constellation. If desired, efficiency may be further enhanced by incorporating satellites with non-circular orbits, polar orbits such as sun synchronous orbits, medium earth orbits, and/or geosynchronous orbits into the satellite constellation. The use of a constellation that includes satellites with inclined circular orbits at multiple different inclinations is merely illustrative.

Within the constellation of satellites 22 in system 10, each group of satellites 22 that share a common orbit (e.g., a common orbital inclination and altitude for a set of low earth orbiting satellites with circular orbits, a common elliptical orbital type for a set of medium earth orbit satellites, a geocentric orbit, etc.), may include any suitable number N of satellites 22. For example, N may be 1-100, 10-1000, 10-10,000, 20-500, at least 10, at least 50, at least 100, at least 200, fewer than 10,000, fewer than 1000, fewer than 500, fewer than 100, or other suitable number.

Satellites 22 in the constellation of satellites may have the same types of antenna arrays (with the same types of antenna elements), may have different types of antennas (e.g., one type of antenna array may be used for low earth orbit satellites, another type of antenna array may be used for sun synchronous satellites, and another type of antenna array may be used for geosynchronous satellites), may have different types of power systems (e.g., different power sources, different numbers of solar panels per satellite, etc.), or may have a common type of power system (e.g., a power system that has the same type and number of solar panels, etc.), may have different satellite buses or may share a common satellite bus architecture, may have different propulsion systems, may share a common type of propulsion system, etc. The satellites in the satellite constellation of system 10 may be communications satellites (e.g., satellites that handle voice and data traffic, audio and/or video media broadcasts such as broadcasts of television traffic, and/or that handle other suitable types of communications traffic). Different sets of satellites (having the same or different components) may have different eccentricities, altitudes (e.g., different circular low earth orbit altitudes or other different circular orbit altitudes such as lower altitudes to minimize latency and higher altitudes to enhance capacity by covering larger areas on the ground per satellite), inclinations, and/or other different orbital attributes. For example, one, two, three, four, or five or more sets of satellites may have circular low earth orbits with different respective inclinations (e.g., inclinations of 0-80°, 10-60°, 30-60°, more than 30°, less than 80°, less than 60°, less than 70°, or other suitable inclinations) and one, two, three, four, or five or more of these orbits may have altitudes that are under a given altitude, whereas one or more additional sets of satellites may have altitudes that are greater than the given altitude. If desired, one or more of these additional sets of satellites may be geosynchronous and one or more of these additional sets of satellites may be characterized by medium earth orbits. Geosynchronous orbits may include inclined geosynchronous orbits (e.g., to enhance coverage at higher latitudes). One or more sets of satellites with one or more different respective elliptic orbits (different respective eccentricities) may be included in the satellite constellation, if desired. Some of the satellites (e.g., satellites with inclined geosynchronous orbits or other orbits) may have storage that caches popular media content (e.g., news headlines, popular media such as popular movies, etc.). Satellites with cached content and/or other satellites may multicast content (e.g., content may be transmitted to multiple users in parallel). In some instances, content can be multicast around the clock, while in other instances content can be multicast during periods of low utilization, e.g., at night. In some instances, some content can be multicast for immediate consumption, while other content (e.g., applications, software updates, media content) can be multicast for storage (e.g., for caching on devices, such as STBs or UEs), such this it is immediately available on demand.

In accordance with an embodiment, a satellite system is provided that includes a satellite constellation having at least first and second sets of communications satellites having different respective first and second orbital inclinations, gateways configured to communicate with the satellite constellation, and a network operations center configured to communicate with the first and second sets of communications satellites using the gateways.

In accordance with another embodiment, the first and second sets of communications satellites have low earth orbits.

In accordance with another embodiment, the low earth orbits of the first and second sets of communications satellites have altitudes below a first orbital altitude and the satellite constellation has at least a third set of communications satellites having a second orbital altitude that is greater than the first orbital altitude.

In accordance with another embodiment, the third set of communications satellites includes geosynchronous satellites.

In accordance with another embodiment, the third set of communications satellites includes medium earth orbit satellites.

In accordance with another embodiment, the third set of communications satellites includes geosynchronous satellites with inclined geosynchronous orbits.

In accordance with another embodiment, the third set of communications satellites includes satellites with elliptical orbits that are characterized by an eccentricity of at least 0.7.

In accordance with another embodiment, the first set of satellites has low earth orbits and includes satellites with a first altitude and satellites with a second altitude that is different than the first altitude.

In accordance with another embodiment, the first and second sets of communications satellites have low earth orbits with different respective altitudes below a first orbital altitude, the satellite constellation has at least a third set of communications satellites having a second orbital altitude that is greater than the first orbital altitude, and the satellite constellation includes a fourth set of communications satellites having a third orbital altitude that is greater than the second orbital altitude.

In accordance with an embodiment, a satellite constellation is provided that includes first, second, and third sets of communications satellites each with a different circular low earth orbit having a different respective orbital inclination, and a fourth set of communications satellites, the first, second, and third sets of communications satellites have orbital altitudes that are less than a first orbital altitude and the fourth set of communications satellites has a second orbital altitude that is greater than the first orbital altitude.

In accordance with another embodiment, the fourth set of communications satellites includes geosynchronous satellites.

In accordance with another embodiment, the fourth set of communications satellites includes geosynchronous satellites with inclined orbits.

In accordance with another embodiment, the fourth set of communications satellites includes medium earth orbit satellites.

In accordance with another embodiment, the satellite constellation includes a fifth set of communications satellites having inclined geosynchronous orbits.

In accordance with another embodiment, the satellite constellation includes a fifth set of communications satellites each having an orbital inclination greater than the orbital inclinations of the first, second, and third sets of communications satellites.

In accordance with another embodiment, the satellites constellation includes at least one geosynchronous satellite.

In accordance with an embodiment, a satellite constellation is provided that includes a first set of communications satellites in low earth orbit, each of the communications satellites in the first set of communications satellites is characterized by an inclined circular orbit with a first inclination and a second set of communications satellites in low earth orbit, each of the communications satellites in the second set of communications satellites is characterized by an inclined circular orbit with a second inclination that is different than the first inclination.

In accordance with another embodiment, each of the communications satellites in the first set of communications satellites has a first antenna array formed from first antenna elements of a given type and each of the communications satellites in the second set of communications satellites has a second antenna array formed from second antenna elements of the given type.

In accordance with another embodiment, communications satellites of the first and second sets of communications satellites each have a common number of solar panels.

In accordance with another embodiment, the satellite constellation includes a third set of communications satellites in low earth orbit, each of the communications satellites in the third set of communications satellites is characterized by an inclined circular orbit with a third inclination that is different than the first and second inclinations, and a fourth set of communications satellites in low earth orbit, where each of the communications satellites in the fourth set of communications satellites is characterized by an inclined circular orbit with a fourth inclination that is different than the first, second, and third inclinations and the first, second, third, and fourth sets of communications satellites are configured to communicate with a common network operations center.

The foregoing is merely illustrative and various modifications can be made to the described embodiments. The foregoing embodiments may be implemented individually or in any combination.

What is claimed is:

1. A method comprising:
routing, using a first set of satellites and a second set of satellites in a satellite constellation, communications between at least one gateway and a plurality of terminals on Earth, wherein
the satellites of the first set are in orbits with a first inclination and a first orbital altitude, the first inclination being between 30 degrees and 60 degrees and the first orbital altitude being between 500 km and 1500 km, and
the satellites of the second set are in orbits with a second inclination different from the first inclination and a second orbital altitude different from the first orbital altitude, the second inclination being between 30 degrees and 60 degrees and the second orbital altitude being between 500 km and 1500 km.

2. The method of claim 1, further comprising:
routing, using a third set of satellites in the satellite constellation, communications between the at least one gateway and the plurality of terminals, wherein the satellites in the third set are in orbits with a third inclination different from the first and second inclinations and a third orbital altitude different from the first and second orbital altitudes, the third inclination being between 30 degrees and 60 degrees.

3. The method of claim 2, wherein the third inclination is 48 degrees.

4. The method of claim 2, wherein the first set of satellites comprises more than 100 satellites, the second set of satellites comprises more than 100 satellites, and the third set of satellites comprises more than 100 satellites.

5. The method of claim 1, further comprising:
routing, using a third set of satellites in the satellite constellation, communications between the at least one gateway and the plurality of terminals, wherein the third set of satellites are in orbits with a third inclination and a third orbital altitude, the third inclination being at least 89 degrees.

6. The method of claim 5, wherein the third orbital altitude is between 500 km and 1500 km and is different from the first and second orbital altitudes.

7. A satellite communications system comprising:
a network; and
at least one gateway configured to route communications between the network and a plurality of electronic devices on Earth using first and second sets of communications satellites in a satellite constellation, wherein:
the communications satellites in the first set are in orbits with a first inclination and a first orbital altitude, the first inclination being between 30 degrees and 60 degrees and the first orbital altitude being between 500 km and 1500 km, and
the communications satellites in the second set are in orbits with a second inclination different from the first inclination and a second orbital altitude different from the first orbital altitude, the second inclination being between 30 degrees and 60 degrees and the second orbital altitude being between 500 km and 1500 km.

8. The satellite communications system of claim 7, wherein the satellite constellation further comprises:
a third set of communications satellites, the communications satellites in the third set being in orbits with a third inclination and a third orbital altitude, the third inclination being different from the first and second inclinations, the third orbital altitude being different from the first and second orbital altitudes, and the at least one gateway being configured to route communications between the network and the plurality of electronic devices using the third set of communications satellites.

9. The satellite communications system of claim 8, wherein the third inclination is between 30 degrees an 60 degrees.

10. The satellite communications system of claim 9, wherein the third orbital altitude is between 500 km and 1500 km.

11. The satellite communications system of claim 9, wherein the third inclination is 48 degrees.

12. The satellite communications system of claim 8, wherein the third inclination is greater than 89 degrees.

13. The satellite communications system of claim 7, wherein the first set includes at least 100 communications satellites.

14. The satellite communications system of claim 13, wherein the second set includes at least 100 communications satellites.

15. A satellite constellation comprising:
a first set of communications satellites in orbits with a first inclination and a first orbital altitude, the first inclination being between 30 degrees and 60 degrees and the first orbital altitude being between 500 km and 1500 km; and
a second set of communications satellites in orbits with a second inclination different from the first inclination and a second orbital altitude different from the first orbital altitude, wherein the second inclination is between 30 degrees and 60 degrees, the second orbital altitude is between 500 km and 1500 km, and the first and second sets of communications satellites are configured to route communications between at least one gateway and a plurality of user equipment devices on Earth.

16. The satellite constellation of claim 15, further comprising:
a third set of communications satellites in orbits with a third inclination different from the first and second inclinations and a third orbital altitude different from the first and second orbital altitudes, the third set of communications satellites being configured to route communications between the at least one gateway and the plurality of user equipment devices.

17. The satellite constellation of claim 16, wherein the third orbital altitude is between 500 km and 1500 km.

18. The satellite constellation of claim 17, wherein the third inclination is between 30 degrees and 60 degrees.

19. The satellite constellation of claim 16, wherein the third inclination is at least 89 degrees.

20. The satellite constellation of claim 16, further comprising:
a fourth set of communications satellites in orbits with a fourth inclination different from the first, second, and third inclinations and a fourth orbital altitude different from the first, second, and third orbital altitudes, the fourth set of communications satellites being configured to route communications between the at least one gateway and the plurality of user equipment devices.

* * * * *

UNITED STATES PATENT AND TRADEMARK OFFICE
CERTIFICATE OF CORRECTION

PATENT NO. : 12,199,739 B2
APPLICATION NO. : 18/461854
DATED : January 14, 2025
INVENTOR(S) : Robert Vaughan et al.

Page 1 of 1

It is certified that error appears in the above-identified patent and that said Letters Patent is hereby corrected as shown below:

In the Claims

Column 12, Line 10, "30 degrees an 60" should read -- 30 degrees and 60 --

Signed and Sealed this
Fourth Day of March, 2025

Coke Morgan Stewart
*Acting Director of the United States Patent and Trademark Office*